United States Patent
Nguyen

(10) Patent No.: US 6,445,599 B1
(45) Date of Patent: Sep. 3, 2002

(54) RIPPLE CANCELING, SOFT SWITCHING ISOLATED DC/DC CONVERTERS WITH REDUCED VOLTAGE STRESS SYNCHRONOUS RECTIFICATION

(75) Inventor: Chien Nguyen, Sunnyvale, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 0 days.

(21) Appl. No.: 09/820,956

(22) Filed: Mar. 29, 2001

(51) Int. Cl.[7] .............................................. H02M 3/335
(52) U.S. Cl. ........................................................ 363/25
(58) Field of Search ................................ 323/222, 272; 363/24, 25, 26, 89

(56) References Cited

U.S. PATENT DOCUMENTS

| | | | | |
|---|---|---|---|---|
| 3,913,000 A | * | 10/1975 | Cardwell, Jr. ............... | 323/222 |
| 4,748,397 A | * | 5/1988 | Ogawa et al. ............... | 323/222 |
| 5,247,239 A | * | 9/1993 | Yamamura et al. .......... | 323/222 |
| 6,084,790 A | * | 7/2000 | Wong .......................... | 323/272 |
| 6,288,918 B1 | * | 9/2001 | Tarodo et al. ............... | 323/209 |

OTHER PUBLICATIONS

Texas Instruments, "TL431, TL431A Data Sheet—Adjustable Precision Shunt Regulators", Oct. 2000 pp 1–18.

* cited by examiner

Primary Examiner—Shawn Riley
(74) Attorney, Agent, or Firm—Blakely, Sokoloff, Taylor & Zafman LLP

(57) ABSTRACT

Ripple canceling, soft switching isolated DC/DC converters with reduced voltage stress synchronous rectification. The converters include interleaved switching converters providing power to a node supplying power to a zero volt switching bi-phase power conversion stage driving synchronous rectifiers feeding an output filter. In one embodiment, the interleaved converters are boost mode converters operating in continuous conduction mode boost converters. Various embodiments are disclosed.

34 Claims, 2 Drawing Sheets

RIPPLE CANCELING, SOFT SWITCHING ISOLATED DC/DC CONVERTERS WITH REDUCED VOLTAGE STRESS SYNCHRONOUS RECTIFICATION

BACKGROUND OF THE INVENTION

1. Field of the Invention

The present invention relates to the field of switching DC to DC converters.

2. Prior Art

DC to DC switching converters of various types are well known in the prior art. Such converters may be used to convert one DC voltage to a second DC voltage which, depending on the converter, may be higher or lower than the first voltage. Switching converters provide a voltage step-up capability not found in linear regulators, and offer higher efficiency than linear regulators in most voltage step-down applications, particularly where the output voltage of the converter is substantially less than the input voltage to the converter. However, switching converters of usual design tend to create significant electrical noise in the form of current ripple on both the converter input and the converter output. This requires substantial capacitance coupled to the input and to the output to keep the voltage ripple on the input supply and on the output voltage within the desired tolerances. While switching converter controllers are generally integrated devices, preferably with limited external devices needed for the complete controller, relatively large filter capacitors on the converter input and output only increases converter cost and board space required for the operative converter.

The present invention, among other things, provides a way of substantially reducing the input ripple and the output ripple in a DC to DC switching converter.

BRIEF SUMMARY OF THE INVENTION

Ripple canceling, soft switching isolated DC/DC converters with reduced voltage stress synchronous rectification. The converters include interleaved switching converters providing power to a node supplying power to a zero volt switching bi-phase power conversion stage driving synchronous rectifiers feeding an output filter. In one embodiment, the interleaved converters are boost mode converters operating in continuous conduction mode boost converters. Various embodiments are disclosed.

DETAILED DESCRIPTION OF THE PREFERRED EMBODIMENT

Figure 1:
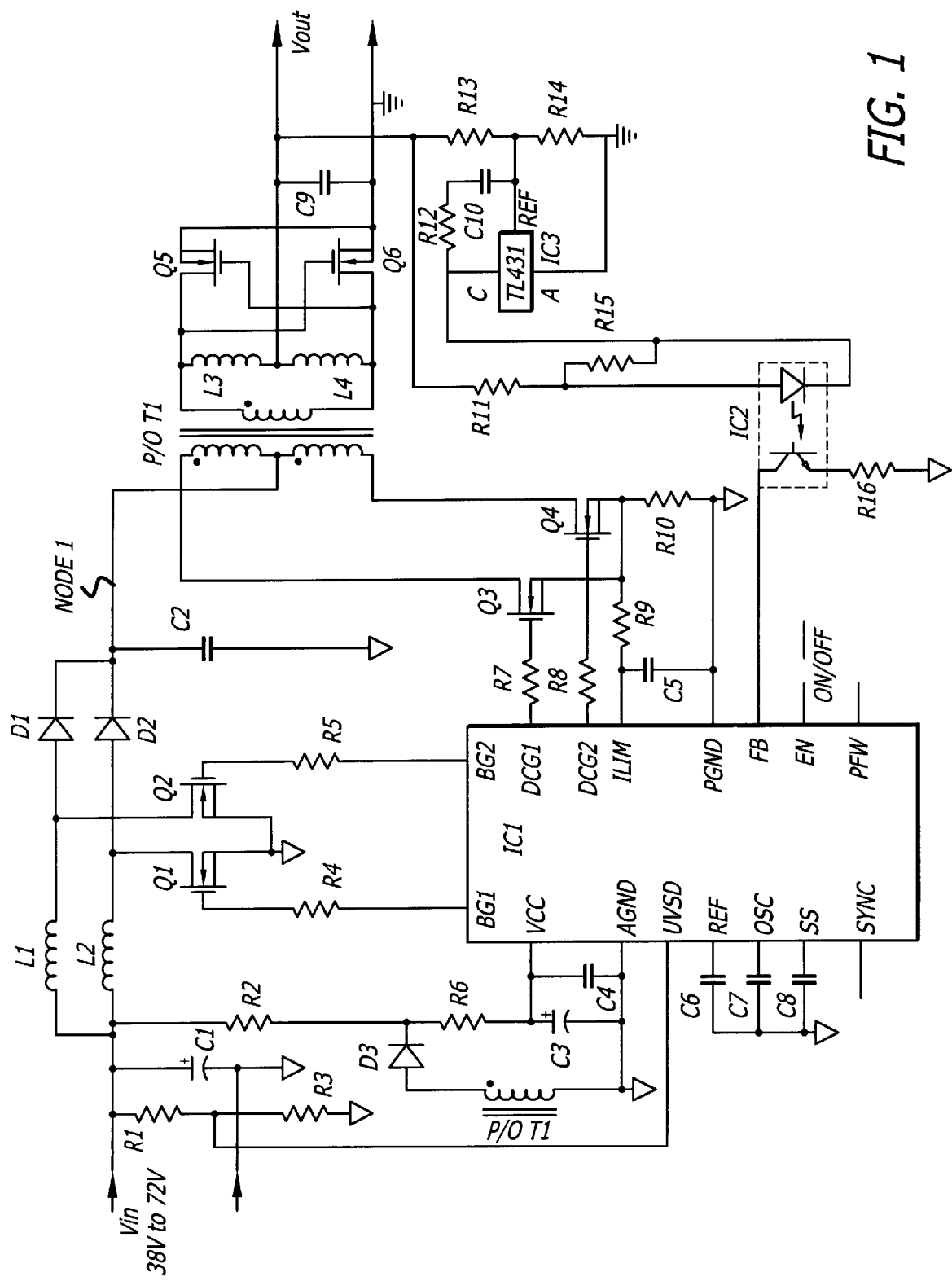
FIG. 1 is a diagram of a preferred embodiment of the present invention.

An exemplary embodiment of the present invention may be seen in FIG. 1. This embodiment of the converter is controlled by an integrated circuit controller IC1, which among other things, controls transistors Q1 and Q2 through resistors R4 and R5, respectively, and controls transistors Q3 and Q4 through resistors R7 and R8, respectively. The input voltage Vin is coupled to node 1 through the series combination of inductor L1 and diode D1, and is also connected to node 1 through the series combination of inductor L2 and diode D2. In normal operation, node 1 will be at a higher DC voltage than the input voltage Vin, capacitor C2 providing ripple reduction on the node 1 voltage.

The gates of transistors Q1 and Q2 are driven by the integrated circuit IC1 through resistors R4 and R5, the transistors themselves in this embodiment being n-channel transistors. (The resistors R4 and R5 provide damping for any high frequency ringing that might otherwise occur from the gate capacitance and the gate lead inductance.) When transistor Q1 is turned on by the voltage on terminal BG1 of the integrated circuit IC1 going high, the current I2 in inductor L2 will increase at a rate given by the equation $di_2/dt = Vin/L2$, during which time diode D2 is back-biased. When the voltage on terminal BG1 goes low, transistor Q1 will turn off. Now the voltage on node 1 ($V_{node1}$) will decrease the current I2 through inductor L2 at a rate given by the equation $di_2/dt = -(V_{node1} - Vin - V_{D2})/L2$, where $V_{D2}$ equals the forward conduction voltage across diode D2 and the minus sign indicates a decreasing current I2. The foregoing equation will apply unless, or until, the current in inductor L2 decreases to zero, after which diode D2 will become back-biased and further current flow in inductor L2 will stop.

In the typical operation of the exemplary embodiment of the present invention, transistor Q1 will be turned on again before the current in inductor L2 goes to zero, and accordingly, the combination of inductor L2, diode D2, smoothing capacitor C2 and transistor Q1 will operate as a continuous conduction mode boost converter. The switching of transistor Q1 is pulse-width modulated by the integrated circuit IC1 responsive to the output of the converter Vout through a feedback circuit to be described, providing a feedback signal on terminal FB of the integrated circuit IC1 for comparison with a reference voltage generated within the integrated circuit IC1.

Inductor L1, diode D1, capacitor C2 and transistor Q2 similarly provide a continuous conduction mode boost converter so that the two boost converters are operating in parallel. By operating the boost converters in an interleaved manner, preferably at a fixed frequency, the ripple current on the input line is greatly reduced, allowing the use of a much smaller capacitor C1 for input current ripple reduction purposes.

Node 1 is connected to the center tap of the primary winding of power output transformer T1, with the ends of the primary winding being coupled to ground through resistor R10 and transistors Q3 and Q4, respectively. The gates of transistors Q3 and Q4 are driven from terminals DCG1 and DCG2 of the integrated circuit through resistors R7 and R8, respectively, the resistors providing damping for any high frequency ringing that might otherwise occur from the gate capacitance and the gate lead inductance.

Resistor R10 is a relatively low-valued sense resistor for alternately sensing the current through transistors Q3 and Q4, the operation of the two transistors having an approximately 50% duty cycle and being out of phase so that both transistors are not on at the same time. The voltage across resistor R10 is coupled to the current limit input terminal ILIM of the integrated circuit through resistor R9, the combination of resistor R9 and capacitor C5 providing noise reduction on the voltage across the resistor R10.

A secondary winding of transformer T1 has its first and second ends coupled through inductors L3 and L4 to the output Vout, through n-channel transistors Q5 and Q6, respectively, to the output ground, and to the gates of transistors Q6 and Q5, respectively. Capacitor C9 provides ripple reduction on the output voltage Vout. The crosscoupling of the gate drive for transistors Q5 and Q6 makes the transistors operate as synchronous rectifying MOS devices feeding the output LC filter to obtain the desired DC voltage output Vout. Also, the switching of transistor Q3 and Q4 with an approximate 50% duty cycle provides zero volt switching of the bi-phase output power conversion stage, which may be either push-pull or a full bridge that drives the main power converter transformer T1 primary. The zero volt switching is easily achieved by the transformer magnetizing and leakage inductance energy, together with the fixed approximately 50% duty cycle operation. In particular, the center tap of the primary winding of transformer T1 will be at the voltage of node 1. When one of transistors Q3 and Q4 is on, that end of the primary winding will be nearly at the circuit ground potential, while the other end of the transformer primary will be nearly at twice the voltage of node 1. When the on transistor turns off, the primary winding voltages will tend to reverse to try to maintain the primary winding current. However the transformer magnetizing and leakage inductance energy will limit the speed at which the voltages will tend to reverse, allowing the switching on of the other transistor as the voltage on the respective transformer lead crosses zero volts. In the embodiment disclosed, the zero volt switching is accomplished by timing of the relative switching of transistors Q3 and Q4, though in an alternate embodiment, switching based on the sensing of the zero volt condition can also be done. Inductors L3 and L4 provide output current doubling, though as an alternative, a center tapped secondary winding may be used on transformer T1, as in the embodiment of FIG. 2 to be described.

The output voltage Vout is coupled back through an opto-coupler IC2 to provide a feedback signal to the feedback terminal FB of the integrated circuit IC1. In particular, the photodiode of the opto-coupler IC2 is driven by a network comprising resistors R11–R15, capacitor C10 and IC3, a precision shunt regulator. In particular, the voltage on the cathode of the shunt regulator may freely increase until the regulation voltage determined by the values of resistors R13 and R14 is reached. Below the regulation voltage, there will be no current through resistors R11 and R15, and accordingly no voltage across or current through the photodiode of the opto-coupler IC2. When the regulation voltage of the shunt regulator is reached, however, the cathode voltage of the regulator will become clamped, with further increases in the output voltage Vout providing a voltage drop across resistor R15, and thus a voltage across the photodiode of the opto-coupler to turn on the phototransistor in the opto-coupler to draw current through the feedback terminal FB, the phototransistor and resistor R16 in an amount dependent upon the strength of the feedback signal. The feedback signal is used to control the pulse width modulation of the alternate boost converters, formed in part by transistors Q1 and Q2.

Transformer T1 in the exemplary embodiment also has another secondary winding coupled through diode D3 to a circuit comprising resistors R2 and R6 and capacitors C3 and C4. Resistor R2 is a rather large valued resistor. When the input Vin is first applied, the small current through resistors R2 and R6 begin to charge capacitors C3 and C4. Once these capacitors reach an adequate voltage, the pulse width modulator and the switching of transistors Q3 and Q4 starts. While in a preferred embodiment, the current through resistor R2 is not adequate to sustain the operation of the integrated circuit (IC1), the voltage induced in the third winding of the transformer T1 as rectified by diode D3 will sustain operation. Alternatively, the third winding could be eliminated and the integrated circuit power VCC supplied through a lower valued resistor for resistor R2. This is not preferred however, as Vin in many applications will be large compared to VCC, so that the power loss through such a resistor would be large compared to the use of the third winding to provide a more efficient source for VCC.

Also included in the integrated circuit of FIG. 1 is an under voltage shutdown circuit of conventional design responsive to the voltage on the UVSD terminal as determined by the ratio of the resistors R1 and R3, and a soft start circuit to limit the duty cycle of the boost converters on the application of power.

In the embodiment of FIG. 1, the use of the current doubling inductors L3 and L4 together with the approximately 50% duty cycle of transistors Q3 and Q4 in the power conversion stage of the circuit result in the output ripple of the converter from the alternate operation of the transistors Q5 and Q6 substantially canceling, grossly reducing the size of the output capacitor C9 required for final ripple reduction. Also the zero volt switching readily attainable for transistors Q3 and Q4 reduces the power loss in the transistors, and the interleaving of the boost converters greatly reduces the input current ripple, thereby reducing the required size of the input current reducing capacitor C1. Synchronizing the turn on of transistors Q3 and Q4 with the trailing edge (turn off) of transistors Q1 and Q2, respectively further reduces ripple in the circuit.

Figure 2:
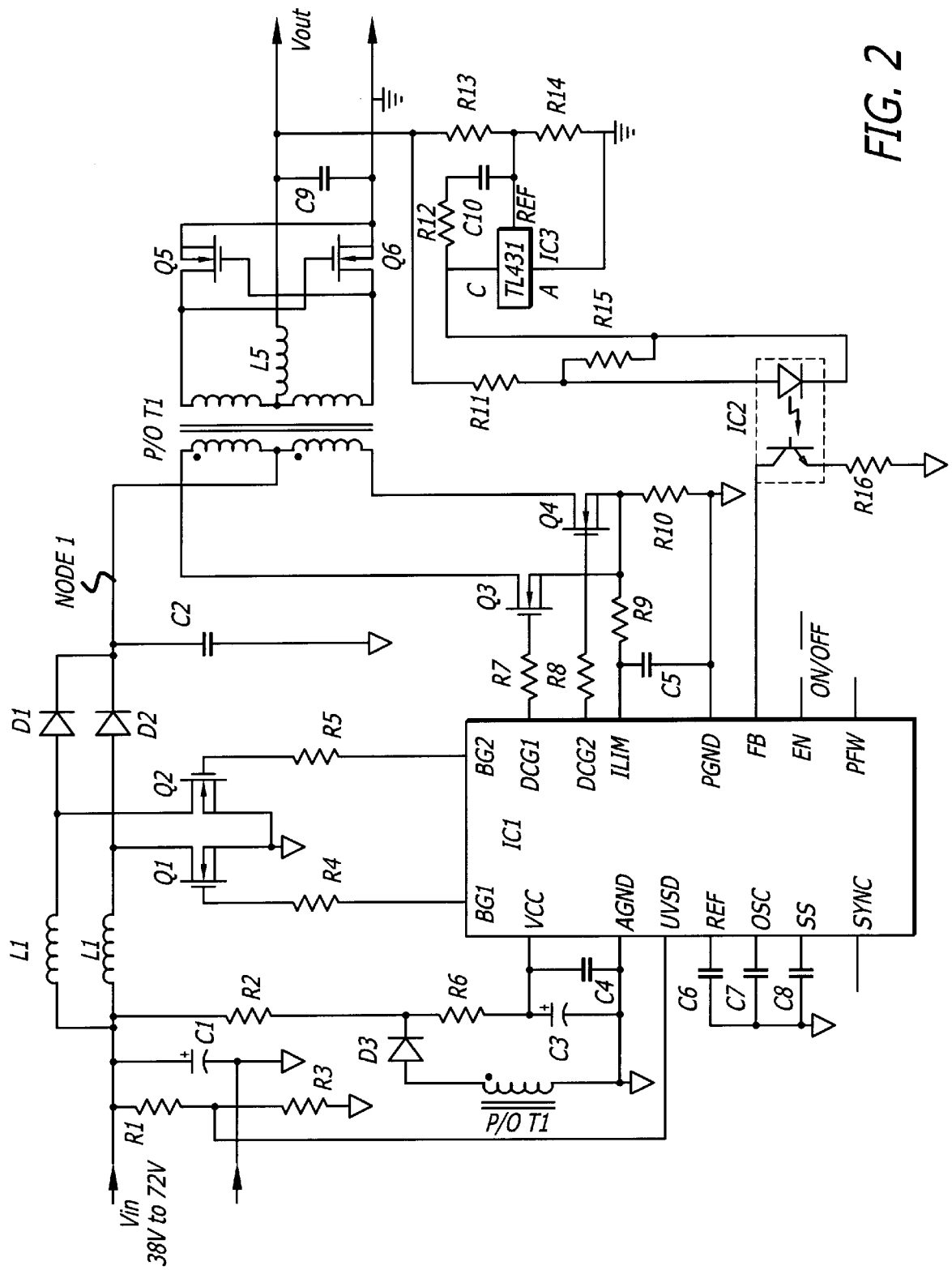
FIG. 2 is a diagram of an alternate embodiment of the present invention.

Now referring to FIG. 2, an alternate embodiment using a center tapped secondary winding on transformer T1 may be seen. In this case, the inductor L5 is coupled to the center tap of the secondary, with the ends of the secondary being coupled through transistors Q5 and Q6, respectively, to the low side of the output Vout (output ground), and to the gates of transistors Q6 and Q5, respectively.

The foregoing disclosure of preferred embodiments of the present invention is for purposes of illustration and explanation and not for purposes of limitation of the invention, as various alternate embodiments will be apparent to those skilled in the art. By way of but one other alternate embodiment, the interleaved switching converters may be interleaved buck converters instead of the interleaved boost converters of the embodiment described in detail herein. Thus, while certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, but instead is to be defined by the full scope of the following claims, since various other modifications will occur to those of ordinary skill in the art.

What is claimed is:

1. A DC to DC converter comprising:
   first and second interleaved DC to DC switching converters having a common output;
   a transformer having an alternating input to its primary from the common output of the first and second interleaved DC to DC switching converters, the alternating input being synchronized with the interleaved switching converters; and,
   a balanced synchronous rectifier circuit coupled to a secondary of the transformer.

2. The DC to DC converter of claim 1 wherein the secondary of the transformer is a center tapped secondary having an inductor coupled to the center tap and forming one output of the converter, the synchronous rectifier circuit being coupled to the ends of the secondary of the transformer and providing a second output of the DC to DC converter.

3. The DC to DC converter of claim 1 further comprised of first and second inductors coupled in series across the secondary of the transformer, the common connection of the inductors forming one output of the DC to DC converter, the synchronous rectifier circuit providing a second output of the DC to DC converter being coupled to the secondary of the transformer.

4. The DC to DC converter of claim 1 wherein the first and second interleaved switching converters are boost mode interleaved switching converters.

5. The DC to DC converter of claim 4 wherein the first and second interleaved switching converters are boost mode continuous conduction interleaved switching converters.

6. The DC to DC converter of claim 4 wherein the alternating input to the transformer is synchronized to the trailing edge of the switching of the boost mode interleaved switching converters.

7. The DC to DC converter of claim 1 wherein the transformer primary is a center tapped primary, the output of the interleaved switching converters being coupled to the center tap, the ends of the primary winding being alternately coupled to a circuit ground through first and second switching transistors.

8. The DC to DC converter of claim 7 wherein the first and second switching transistors are switched using zero volt switching.

9. The DC to DC converter of claim 8 wherein the first and second switching transistors are MOS transistors.

10. The DC to DC converter of claim 8 wherein the switching of the first and second switching transistors is synchronized to the trailing edge of the switching of the interleaved switching converters.

11. A DC to DC converter comprising:
first and second interleaved boost mode DC to DC switching converters;
a transformer having an alternating input to its primary synchronized with the interleaved switching converters, and a center tapped secondary;
a balanced synchronous rectifier circuit; and, the center tap of the secondary of the transformer being coupled through an inductor to form one output of the DC to DC converter, the synchronous rectifier circuit being coupled to the ends of the secondary of the transformer to provide a second output of the DC to DC converter.

12. The DC to DC converter of claim 11 wherein the first and second interleaved switching converters are boost mode continuous conduction converters.

13. The DC to DC converter of claim 12 wherein the alternating input to the transformer is synchronized to the trailing edge of the switching of the interleaved boost mode switching converters.

14. The DC to DC converter of claim 11 wherein the transformer primary is a center tapped primary, the output of the interleaved switching converters being coupled to the center tap, the ends of the primary winding being alternately coupled to a circuit ground through first and second switching transistors.

15. The DC to DC converter of claim 14 wherein the first and second switching transistors are switched using zero volt switching.

16. The DC to DC converter of claim 15 wherein the first and second switching transistors are MOS transistors.

17. The DC to DC converter of claim 15 wherein the switching of the first and second switching transistors is synchronized to the trailing edge of the switching of the interleaved switching converters.

18. A DC to DC converter comprising:
first and second interleaved boost mode DC to DC switching converters;
a transformer having an alternating input to its primary synchronized with the interleaved switching converters;
a balanced synchronous rectifier circuit; and,
first and second inductors coupled in series across the secondary of the transformer, the common connection of the inductors forming one output of the DC to DC converter, the synchronous rectifier circuit being coupled to the secondary of the transformer to provide a second output of the DC to DC converter.

19. The DC to DC converter of claim 18 wherein the first and second interleaved switching converters are boost mode continuous conduction converters.

20. The DC to DC converter of claim 19 wherein the alternating input to the transformer is synchronized to the trailing edge of the switching of the interleaved boost mode switching converters.

21. The DC to DC converter of claim 18 wherein the transformer primary is a center tapped primary, the output of the interleaved switching converters being coupled to the center tap, the ends of the primary winding being alternately coupled to a circuit ground through first and second switching transistors.

22. The DC to DC converter of claim 21 wherein the first and second switching transistors are switched using zero volt switching.

23. The DC to DC converter of claim 22 wherein the first and second switching transistors are MOS transistors.

24. The DC to DC converter of claim 22 wherein the switching of the first and second switching transistors is synchronized to the trailing edge of the switching of the interleaved switching converters.

25. A method of converting a first DC voltage to a second DC voltage comprising:
operating first and second DC to DC switching converters in an interleaved manner;
coupling the output of the switching converters to the primary of a transformer in an alternating manner synchronized with the interleaved switching converters; and, synchronously rectifying the output of the secondary of the transformer to provide an output at the second DC voltage.

26. The method of claim 25 wherein operating the first and second DC to DC switching converters in an interleaved manner comprises operating the first and second DC to DC switching converters in a pulse width modulated interleaved manner responsive to the second DC voltage.

27. The method of claim 26 wherein synchronously rectifying the output of the secondary of the transformer comprises coupling an inductor to a center tap of the secondary of the transformer to form a first converter output, and synchronously rectifying the output of the secondary of the transformer relative to the first converter output to form the second converter output.

28. The method of claim 26 wherein synchronously rectifying the output of the secondary of the transformer comprises coupling first and second inductors in series across the secondary of the transformer, and synchronously rectifying the output of the secondary of the transformer relative to the common connection of the inductors.

29. The method of claim 26 wherein operating the first and second DC to DC switching converters in an interleaved manner comprises operating first and second DC to DC boost mode switching converters in an interleaved manner.

30. The method of claim 26 wherein coupling the output of the switching converters to the primary of a transformer in an alternating manner synchronized with the interleaved switching converters comprises coupling the output of the switching converters to the primary of a transformer in an alternating manner synchronized with the trailing edge of the switching of the interleaved switching converters.

31. The method of claim 30 wherein the transformer primary is a center tapped primary, the output of the interleaved switching converters being coupled to the center tap, the ends of the primary winding being alternately coupled to a circuit ground through first and second switching transistors.

32. The method claim 31 wherein the first and second switching transistors are switched using zero volt switching.

33. The method claim 32 wherein the first and second switching transistors are MOS transistors.

34. The method of claim 32 wherein the switching of the first and second switching transistors is synchronized to the trailing edge of the switching of the interleaved switching converters.

* * * * *